J. T. HICKLIN.
Grain-Separators.

No. 153,956

Patented Aug. 11, 1874.

UNITED STATES PATENT OFFICE.

JOHN T. HICKLIN, OF OLYMPIA, WASHINGTON TERRITORY.

IMPROVEMENT IN GRAIN-SEPARATORS.

Specification forming part of Letters Patent No. 153,956, dated August 11, 1874; application filed April 18, 1874.

*To all whom it may concern:*

Be it known that I, JOHN T. HICKLIN, of Olympia, in the county of Thurston and Territory of Washington, have invented a new and Improved Grain-Separator, of which the following is a specification:

The invention will first be fully described, and then pointed out in the claim.

Figure 1:
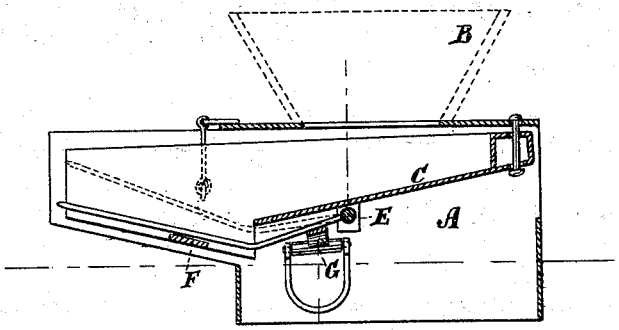
Figure 2:
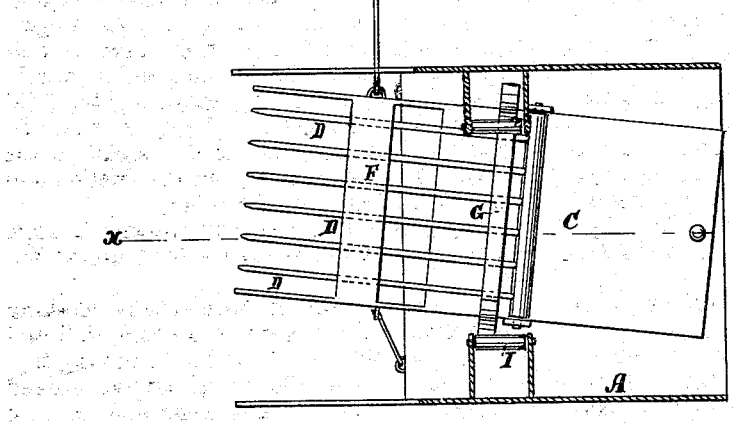
Figure 3:
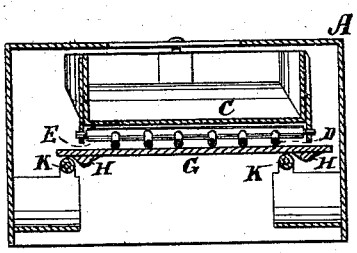

Figure 1 is a sectional elevation of a part of a fanning-mill or other like grain-separator with my invention applied to it, the section being taken on the line $x \, x$ of Fig. 2. Fig. 2 is a horizontal section. Fig. 3 is a transverse section.

Similar letters of reference indicate corresponding parts.

A is a part of the case or body of the machine, on the top of which the hopper B, (shown dotted,) for feeding the thrashed grain, rests. C represents the horizontally-shaking shoe, in which the fingers D are mounted for separating the straw, chaff, &c., said fingers being pivoted at E, at the upper end, and resting near the front end upon the bar F so as to be allowed to rise and fall. G is a bar attached to the under side of the fingers, near its upper end, and carrying a couple of cams or tappets, H, on its under side, which, in passing forward and backward over rollers I on fixed bearings K, supported on the case, give to the fingers a quick up-and-down motion in addition to its horizontal motion with the shoe, which greatly increases its efficiency in separating the light matters from the grain. Cams or other stationary objects may be used instead of the rollers with good results; but the friction and wear will be less with the rollers.

Having thus described my invention, I claim as new and desire to secure by Letters Patent—

The combination of horizontally-shaking riddle-shoe C, the fingers D, pivoted at E and resting upon the bar F, the bar G having tappets H H, and the rollers I, arranged in fixed bearings K, as shown and described, to give both a vertical and horizontal motion to the riddle.

JOHN T. HICKLIN.

Witnesses:
   FRANCIS HENRY,
   ALBERT A. PHILLIPS.